United States Patent [19]

Wickham

[11] 4,103,977
[45] Aug. 1, 1978

[54] VEHICLE BRAKING CONTROL VALVE APPARATUS FOR QUICK SERVICE OPERATION

[75] Inventor: David John Wickham, London, England

[73] Assignee: Westinghouse Brake & Signal Co. Ltd., England

[21] Appl. No.: 835,191

[22] Filed: Sep. 21, 1977

Related U.S. Application Data

[63] Continuation-in-part of Ser. No. 708,317, Jul. 26, 1976.

[51] Int. Cl.² .............................................. B60T 15/42
[52] U.S. Cl. ...................................... 303/38; 303/69; 303/82
[58] Field of Search .................................. 303/36–39, 303/69, 74, 83, 81, 82

[56] References Cited

U.S. PATENT DOCUMENTS

| 3,966,269 | 6/1976 | McEathron | 303/37 |
| 4,014,580 | 3/1977 | Bridieum | 303/69 X |

*Primary Examiner*—Stephen G. Kunin
*Attorney, Agent, or Firm*—Larson, Taylor and Hinds

[57] ABSTRACT

A continuous quick service device is proposed for use in conjunction with a direct release brake controlling triple valve and which, while not interfering with the emergency valve operation, operates by employing quick action chamber air both as a reference against which brake pipe pressure reductions are detected and as a source of air to operate a pressure responsive device in a reciprocating manner to discharge pulses of air from a reducing brake pipe to afford quick service operation of the triple valve both for initial application from a brakes released condition and for subsequent brake pipe pressure reductions giving rise to increased brake applications. A relay valve serves to operate the pressure responsive device to provide additional sensitivity.

8 Claims, 3 Drawing Figures

VEHICLE BRAKING CONTROL VALVE APPARATUS FOR QUICK SERVICE OPERATION

CROSS-REFERENCE TO RELATED APPLICATION

This application is a continuation-in-part of application Ser. No. 708,317, filed on July 26, 1976.

This invention relates to vehicle braking control apparatus and relates especially to control apparatus which operates to control the application of fluid pressure to a brake cylinder in response to a reduction of fluid pressure in a brake pipe in relation to the fluid pressure in a reference chamber, typically an auxiliary reservoir.

In the Specification of U.S. Pat. No. 3,707,314 there is described a fluid operable brake control triple valve apparatus having brake cylinder inlet and exhaust valves for controlling the supply of fluid pressure into and out of a brake cylinder, the valves being operable by a pressure responsive member movable in response to pressure applied to a brake pipe, a quick service bulb inlet valve via which the brake pipe is connectable to a quick service bulb capacity, a bulb exhaust valve via which the quick service bulb capacity is ventable, the bulb inlet and bulb exhaust valves being operable by the member, the bulb inlet valve being opened to effect a discharge of brake pipe pressure into the bulb capacity during movement of the member in response to a reduction of brake pipe pressure to initiate a brake application. This quick service facility has the shortcoming that following an application, the quick service bulb is connected to the brake pipe and for continuing reductions of brake pipe pressure, no quick service facility is provided.

According to the present invention there is provided a valve apparatus for improved quick service operation in a vehicle braking system, including a reference pressure signal input port and a brake pipe pressure signal input port, a pressure responsive means responsive to a pressure difference at said ports for permitting a fluid flow tending to equalize said pressure signals and means responsive to said fluid flow to produce a control pressure on a further pressure responsive member which controls one valve to assist a changing brake pipe pressure and another valve for modifying said control pressure to thereby reciprocate the said pressure responsive member, the apparatus further comprising a relay valve operable in response to pressure built up due to the fluid flow to produce the said control pressure.

The invention also provides vehicle brake control valve apparatus including a brake control valve having first pressure responsive means responsive to a reduction of pressure at a brake pipe pressure input port relative to a first reference pressure to effect operation of valve means for applying fluid pressure to a brake actuator, the apparatus further including quick service valve means having a reference pressure signal input port and a brake pipe pressure signal input port, second pressure responsive means responsive to a difference of pressures at said reference pressure signal input port and at said brake pipe pressure signal input port to permit a fluid flow tending to equalize the said pressure signals and means responsive to such fluid flow for producing a change of a resultant control pressure to a further pressure responsive means, said further pressure responsive means being coupled to one valve operation of which provides a fluid flow path to supplement the change of brake pipe pressure and another valve operation of which provides a fluid flow path for fluid under pressure for counteracting the change of the said resultant control pressure to reciprocate the further pressure responsive means and thereby effect pulsed assistance of brake pipe pressure changes, the control pressure being produced by a relay valve operable in response to the pressure build up due to the fluid flow.

Preferably, the supply of fluid to the relay valve for establishing the control pressure is common with the brake pipe.

In order that the invention may be more clearly understood and readily carried into effect, the same will be further described by way of example, with reference to the accompanying drawings, of which:

Figure 1:
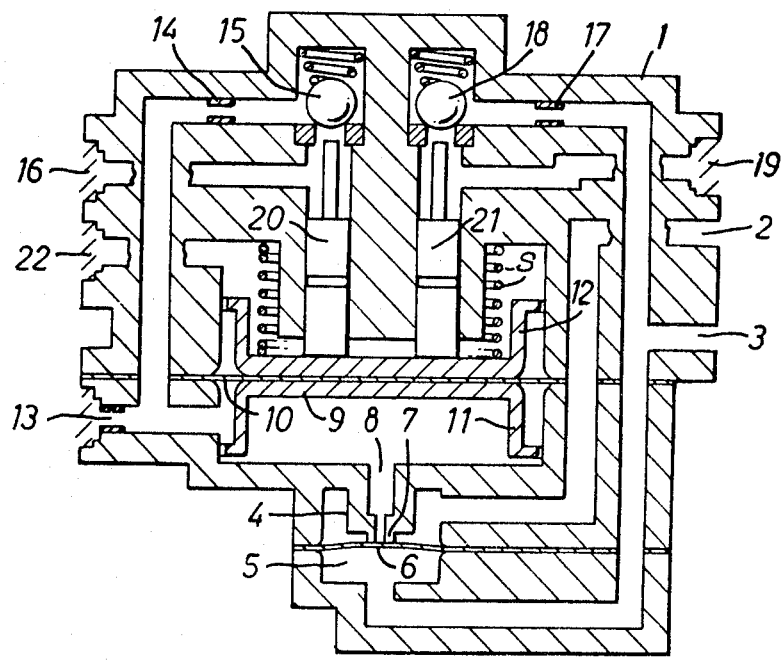
FIG. 1 illustrates a "continuous quick service valve" in accordance with the invention disclosed in co-pending application Ser. No. 708,317.

Referring to FIG. 1 of the drawings, the apparatus disclosed in application Ser. No. 708,317 comprises a main housing 1, having a reference pressure signal input port 2 and a brake pipe pressure signal input port 3. The ports 2 and 3 are connected to regions 4 and 5, respectively above and below a diaphragm 6. The diaphragm 6 constitutes a pressure responsive means and is movable in accordance with pressure differences across it towards or away from an annular seat 7, the way through which is closable by the diaphragm 6 when in engagement therewith. The way through the seat 7, denoted by reference 8, communicates with the underside of a further pressure responsive member 9 formed by a diaphragm 10 clamped between a pair of guide members 11 and 12, the upper guide member 12 being downwardly urged by a spring S which is captive in the housing. The underside of the further pressure responsive member communicates via a small choke 13 with atmosphere and also via a further choke 14 with one side of one valve 15 which is shown in the closed position. The underside of the one valve 15 communicates with atmosphere via a port 16. The brake pipe pressure signal input port 3 is connected additionally via a choke 17 to the upperside of another valve 18 which is identical to 15 and is also shown closed. The underside of this valve also communicates via a port 19 with atmosphere. The pressure responsive member 9 carries two operating rods 20 and 21 which are sealingly slideable in the housing 1 and are such that on an increase of pressure on the upperside of the further pressure responsive member 9 which is sufficient to overcome the downward forces, operates the rods 20 and 21 to unseat the valves 15 and 18 respectively. The upperside of the further pressure responsive member is connected to atmosphere via a port 22. For a better understanding of the operation of the apparatus described above, reference may initially be had to the specification of co-pending Patent Application Ser. No. 591,320 now U.S. Pat. No. 4,025,125, which illustrates an emergency portion of a brake control valve apparatus and which is intended to operate in conjunction with a triple valve, the latter operating as the service portion. In the emergency portion described in the latter co-pending patent application, there is a pressure responsive member on one side of which is provided a quick action chamber reference pressure and to the underside of which the brake pipe is connected.

The apparatus in accordance with the present invention, is assumed to be mounted alongside an emergency portion of fluid operable brake control valve apparatus such as described in the said co-pending application Ser. No. 591,320, as illustrated in diagrammatical form in FIG. 2. The reference pressure signal input port 2 is connected to the quick action chamber (QAC) of the emergency portion 21 and the brake pipe pressure signal input port 3 being connected to the brake pipe 22.

The pipe bracket upon which the emergency portion is mounted is represented by reference 23 and this also carries a triple valve 24 as the service portion of the control valve apparatus. Emergency and auxiliary reservoirs 25 and 26 are shown connected to the emergency and service portions and the output of the service portion, which in the event of a emergency valve operation is also supplemented by emergency reservoir air, is applied to a brake cylinder represented by reference 27. In this connection, it will be appreciated from the specification of co-pending application Ser. No. 591,320 that for a normal service application, the emergency portion merely provides a path via which the quick action chamber pressure is enabled to follow reductions of brake pipe pressure. Only when the brake pipe pressure falls at more than a prescribed rate is the emergency portion operated to effect rapid venting of the brake pipe and connection of the emergency reservoir to the brake cylinders to supplement a full service application.

Referring again to FIG. 1 of the accompanying drawings, a service application is attended by a reduction of brake pipe pressure at the port 3 in relation to the pressure at the port 2 and the diaphragm 6 therefore is moved away from the annular seat 7 such as to provide a path via the port 2 for a fluid flow tending to equalize these pressure signals. Such a flow gives rise to a pressure beneath the second pressure responsive means 9 which builds to a level which lifts the further pressure responsive means 10,11 and 12 to unseat the valves 15 and 18. Unseating of the valve 18 permits a controlled dissipation of fluid via the choke 14 to atmosphere at port 16 with a resultant reduction of the control signal pressure under the second pressure responsive means. The latter therefore moves downwardly under the overriding influence of the spring S and the process is repeated in cyclic manner. Such cyclic operation is transmitted also to the second valve means 18 whereby a continuously pulsing discharge of fluid from the brake pipe via port 3 and the choke 17 occurs to atmosphere at 19. This process continues for further or continuing reductions of brake pipe pressure. When the pressure in the brake pipe steadies, the pressure then overriding the control signal pressure under the further pressure responsive means which leaks away via the choke 13 and the seat 7 is closed-off.

By virtue of the arrangement discussed above, there is provided a continuous quick service facility which is such as to supplement any quick service facility provided in the service portion of the control valve apparatus as a whole and its operation is moreover in no way restricted to an initial operation of the brakes from a release condition.

While the apparatus described (like the emergency portion of the control valve itself) provides a path via which fluid flow from the quick action reference chamber is dissipated towards the brake pressure, it is intended that this flow, while sufficient to produce the control signal under the diaphragm 10, is not such as to appreciably affect the operation of the emergency portion 21 of the control valve apparatus with which it is used.

In a variation on the above described apparatus, it may be desirable to include in the passage between the brake pipe pressure signal input port 3 and the valve 18 a bulb capacity which is subsequently dissipated via the valve 18 in a cyclic manner, possible via a further restriction.

Alternatively, it may be desirable to provide a bulb capacity downstream of the valve 18 into which the brake pipe is cyclicly discharged by the valve 18 and the bulb being connected to atmosphere via a suitable restriction.

Further, improved operation may be achieved by providing overlap or "lost motion" between the operation of the first and second valves 18 and 15 respectively. For example, valve 18 may be arranged to open before 15 during upward movement of the diaphragm 11 and close after 15 during downward movement.

Further, yet another improvement may be achieved to give more positive operation by replacing or supplementing choke 13 with a spring-loaded check valve which opens when a given pressure level is achieved beneath 10.

The arrangement described hereinbefore, and disclosed in application Ser. No. 708,317, operates upon the basis of cyclically operable valve which assists changing brake pipe pressure, the valve being operated by the pressure responsive member comprising elements 10, 11 and 12 of FIG. 1 which is moved directly by quick action chamber pressure fed via the sensitive valve effectively provided by diaphragm 6. In some applications, it may be required to make the arrangement altogether more sensitive and to achieve this pressure responsive member comprising elements 10, 11 and 12 are operated, in accordance with the present invention, by air pressure relayed via a suitable relay valve arrangement such as shown in FIG. 3.

Figure 3:
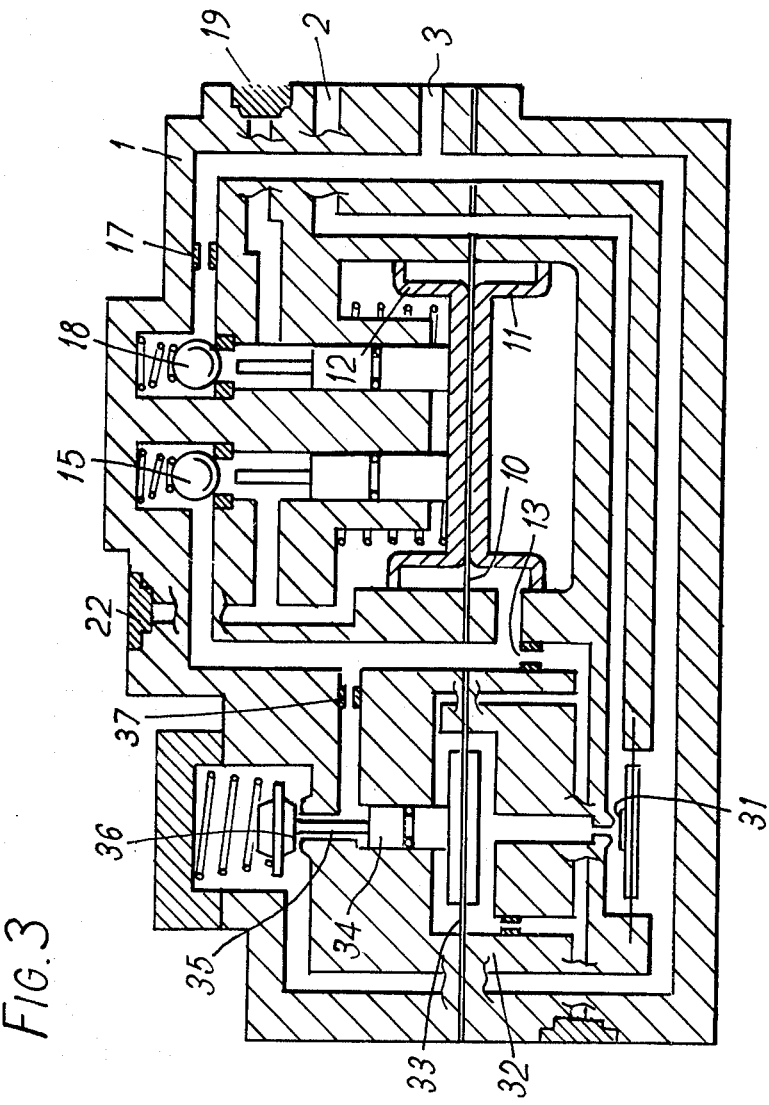
FIG. 3 illustrates a modification in accordance with the invention of a continuous quick service valve such as shown in FIG. 1.

In FIG. 3, which depicts the present invention, the ports which are the same as those of FIG. 1, are given the same reference numerals and it will be seen that brake pipe pressure at port 3 is again supplied beneath a sensitive diaphragm valve now denoted by reference 31, the pressure above which is again quick action chamber pressure at port 2. Quick action chamber air fed via the valve 31 on lowering of brake pipe pressure, is fed to the region 32 beneath a relay valve diaphragm 33, which member is carried by a sealingly slideable rod 34 which, via a stem 35, engages a normally lightly spring-loaded and closed valve 36. This valve 36 when opened provides a communication via a restriction 37 between the brake pipe and the underside of the main cyclically operable pressure responsive member comprising elements 10, 11 and 12. The brake pipe therefore acts in this case as the source of pressure for operating the latter member.

In operation, with a reduction of greater than, say, 0.5 psi of brake pipe pressure in relation to quick action chamber pressure, the sensitive valve 31 opens, feeding quick action chamber air beneath diaphragm 33 and, since the pressure above it is atmospheric, valve 36 is opened to supply brake pipe air beneath 10 and 11. The valves 15 and 18 are again therefore operated cyclically as described with reference to FIG. 1, for as long as the brake pipe pressure reduces in relation to quick action chamber pressure. This occurs since the rate of flow of air via the restriction 37 is such as to enable the air pressure beneath 10 and 11 to fall via valve 15. Moreover, any leakage of air to the region beneath 10 and 11 in the evaporated condition, flows via the small restriction 13 to atmosphere, which therefore prevents spurious operation of 10 and 11 by such a leakage.

Figure 2:
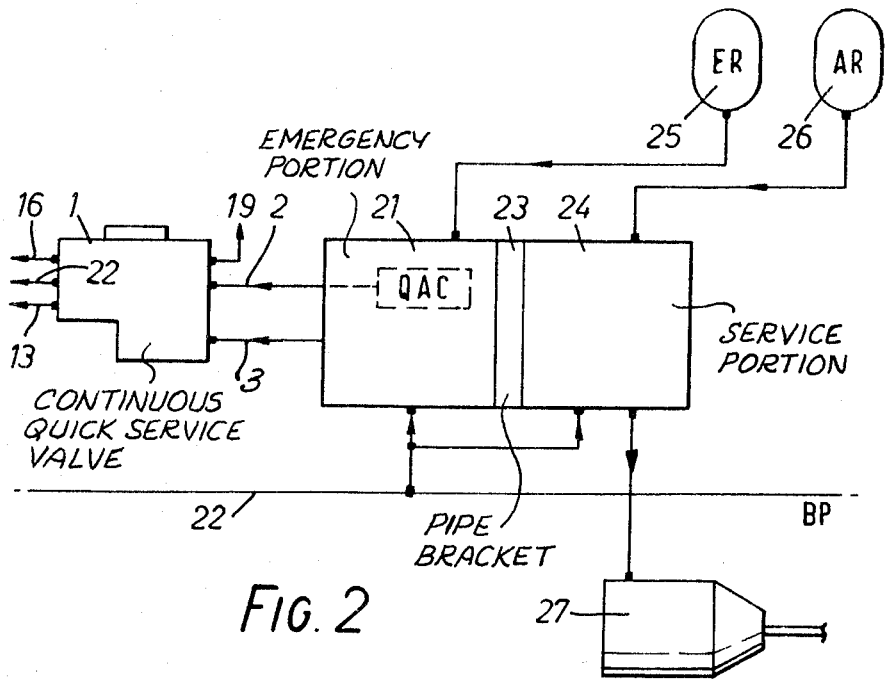
FIG. 2 illustrates fluid pressure operable braking apparatus employing such a quick service valve.

The arrangement of quick service valves as shown in FIG. 3 can, for example, be employed in the apparatus of FIG. 2.

From the foregoing it will be appreciated that variations and modifications of the quick service valve and arrangement described are possible within the scope of the invention.

I claim:

1. A valve apparatus for improved quick service operation in a vehicle braking system, including a reference pressure signal input port and a brake pipe pressure signal input port, a pressure responsive member responsive to a pressure difference at said ports for permitting a fluid flow tending to equalize said pressure signals and means responsive to said fluid flow to produce a control pressure on a further pressure responsive member which controls one valve to assist a changing brake pipe pressure and another valve for modifying said control pressure to thereby reciprocate the said further pressure responsive member, said apparatus further comprising a relay valve operable in response to pressure built up due to said fluid flow to produce said control pressure.

2. Apparatus as claimed in claim 1, wherein a bulb capacity is connected upstream of the said one valve.

3. Apparatus as claimed in claim 1, wherein a bulb capacity is connected downstream of the said one valve and flow therefrom to atmosphere being provided for via a flow restriction.

4. Apparatus as claimed in claim 1, a restricted fluid flow path to atmosphere being provided for relieving the said control pressure in the absence of changing pressure at the brake pipe pressure input port in relation to the reference pressure.

5. Apparatus as claimed in claim 1, wherein the one valve is arranged to open in advance of said another valve and to close thereafter.

6. Apparatus as claimed in claim 1, wherein the supply of fluid to the relay valve for establishing the control pressure is common with the brake pipe.

7. Vehicle brake control valve apparatus including a brake control valve having first pressure responsive means responsive to a reduction of pressure at a brake pipe pressure input port relative to a first reference pressure to effect operation of valve means for applying fluid pressure to a brake actuator, the apparatus further including quick service valve means having a reference pressure signal input port and a brake pipe pressure signal input port, second pressure responsive means responsive to a difference of pressures at said reference pressure signal input port and at said brake pipe pressure signal input port to permit a fluid flow tending to equalize the said pressure signals and means responsive to such fluid flow for producing a change of a resultant control pressure to a further pressure responsive means, said further pressure responsive means being coupled to one valve operation of which provides a fluid flow path to supplement the change of brake pipe pressure and another valve operation of which provides a fluid flow path for fluid under pressure for counteracting the change of the said resultant control pressure to reciprocate the further pressure responsive means and thereby effect pulsed assistance of brake pipe pressure changes, said apparatus further comprising a relay valve operable in response to pressure built up due to said fluid flow to provide said control pressure.

8. Apparatus as claimed in claim 7, wherein the supply of fluid to the relay valve for establishing the control pressure is common with the brake pipe.

* * * * *